_United States Patent Office_ 3,103,276
Patented Sept. 10, 1963

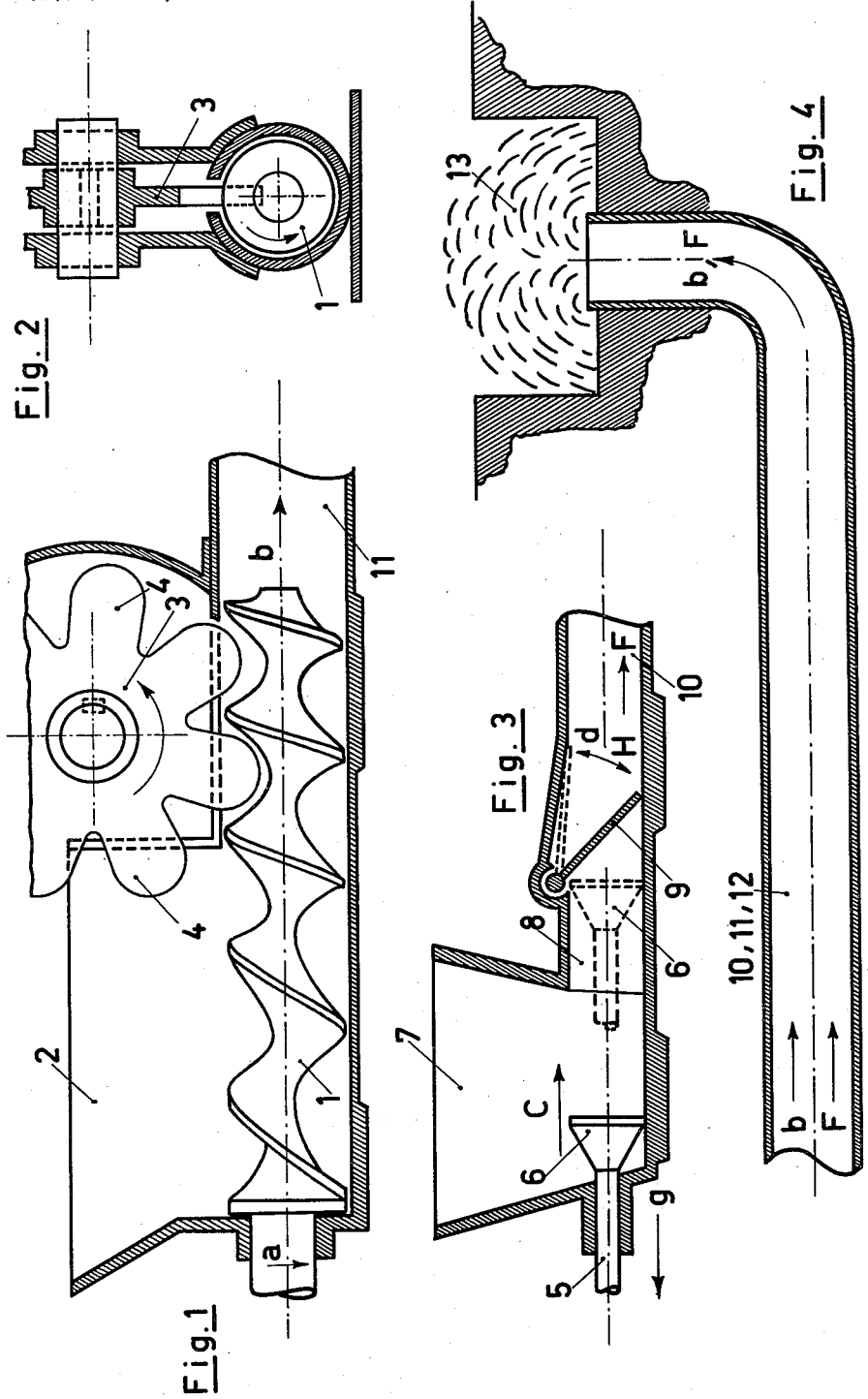

3,103,276
CONVEYOR FOR DUNG
Karl Schmitzer, Gutenbrunnstrasse 20,
Salzburg-Gneis, Austria
Filed Jan. 7, 1959, Ser. No. 785,515
Claims priority, application Austria Jan. 9, 1958
3 Claims. (Cl. 198—226)

Whereas the dung daily produced in stables, or the like, every day had to be carried to the storage place by hand, with the aid of a cart, for centuries, a number of mechanical devices have been applied in recent years in order to facilitate this heavy and dirty work. Conveyor belts or push rod systems have been used for conveying the dung from the dung plate to the storage place. All these devices have the great disadvantage that those parts thereof which are disposed outside the stable or the like tend to freeze in winter whereby the entire installation is rendered inoperative.

Dung removal plants are known, in which the dung is suspended with water and is pumped through pipelines to a collecting pit, from which the dung and water must be removed by pumping. Apart from the larger amount of water required, it is not possible to suspend dung containing a large amount of straw; this will cause clogging. Finally, a dung removal plant is known, in which the dung is pushed below the floor of the stable or the like by a conveyor screw in an open dung gutter to the storage place. Since the dung is not guided on all sides and there is no suitable pressure device, clogging cannot be prevented in this latter system, whereby the plant will be rendered inoperative; in addition, this plant is very expensive and complicated.

As contrasted therewith the conveyor according to the invention comprises a pressure pipeline, which opens at one end in the bottom of the stable or the like in a suitably funnel-shaped feed opening and at the other end at the storage place and which comprises pressure means disposed adjacent to the feed opening and compacting the dung in the conveyor pipe and pushing it as a line of dung to the storage place. Other features of the invention reside in special constructions to ensure a frost-proof and uniform distribution of the line of dung on the storage place.

Two illustrative embodiments of the invention are shown on the acompanying drawing.

FIG. 1 shows together with FIGS. 4 and 5 one embodiment in a longitudinal sectional view.

FIG. 2 shows the same embodiment in a cross-sectional view.

Figure 5:
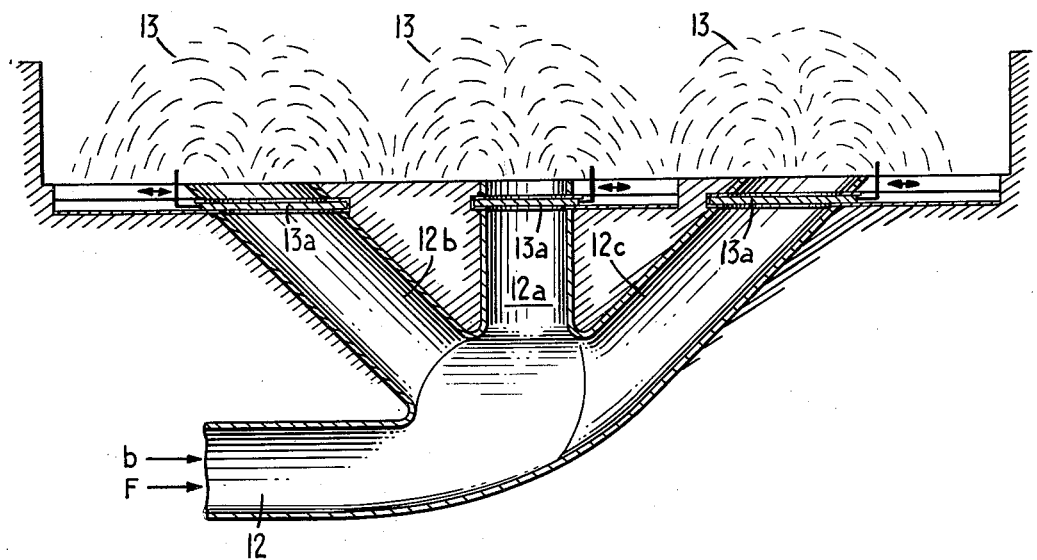

FIG. 3 together with FIG. 4 is a longitudinal sectional view of a second embodiment of the invention.

According to FIGS. 1 and 4, a conveyor screw is rotatably mounted at the end of a pipeline 11. Above the conveyor screw, a feed hopper 2 is provided for receiving the downfalling dung and for removing the liquid manure. The screw 1 is in loose mesh with a non-driven worm wheel 3, the teeth 4 of which coact with the screw or worm is known manner. The screw 1 is driven by a motor. The dung collected on the floor of the stable or the like is fed from the dung plate to and into the feed hopper 2 either by hand or automatically by a dung removal device. Then the conveyor screw 1 is operated to compact the dung in the pipeline 11, which is connected to the pipeline 12 (FIG. 4), and to convey the dung as a line of dung to the storage place. The pipeline 12 extends suitably below the ground in order to be protected against frost and opens out below the storage place 13 so that the contents of the pipes cannot freeze at any point of its conveying path.

The worm wheel 3 is provided to prevent the dung from forming a roll and from idling with the screw 1 when it is completely filled with dung. One or more teeth 4 of the wheel 3 are always in mesh with the screw to prevent the dung enveloping the screw 1 from rotating therewith on the spot. Thus, the worm wheel 3 ensures that the line of dung forced in the pipeline 11 will be conveyed in any case even when the screw is packed and the feed pressure in the feed hopper 2 is low. To increase the slidability of the line of dung in the pipeline 11 or 12, the liquid manure produced in the stable or the like is also introduced into the pipeline system 11, 12 by the feed hopper 2 so that the rotation of the screw 1 causes a mingling and compacting of the dung, the litter and the liquid manure in the pipe. This will always ensure the slidability of the line of dung in the pipe. The line of dung cannot adhere to and dry on the pipe walls because the access of air to the pipeline is prevented at the receiving end by the screw 1 and at the other end by the dung piled at the storage place over the other end of the pipe. As a result, the line of dung in the pipe will always remain slidable on the smooth pipe walls, which consist suitably of concrete and are covered with a low-friction bituminous layer. The line of dung which emerges from the pipeline 12 at the storage place in the direction indicated by the arrow b under the action of the feed screw 1 is fed to the storage place from below and will spread there in the form of a crater, without requiring manual distribution. In the case of larger storage places the end of the pipeline 12 may be divided into several branches, which can be shut off individually and are opened and closed in dependence on the building up of the pile so that the line of dung emerging from the pipeline is systematically distributed in the storage place (not shown in FIG. 4).

To recover the valuable liquid manure, the floor of the storage place 13 may be provided in a manner known per se at one or more points with a grid, from which the liquid manure pressed out by the storage presure at the storage place is fed to a closed liquid manure tank. This will avoid a loss of valuable nitrogen (not shown in FIG. 4).

The function of the device is apparent from the drawing. The liquid manure is conducted into the feed hopper 2 in the floor of the stable or the like. The dung is also fed into the hopper 2 from the dung plate of the stable or the like from time to time. The screw 1 is driven by a motor in the sense of the arrow a, whereby the worm wheel 3 is caused to rotate freely so that its teeth 4 enter the line of dung to prevent a rotation thereof with the screw. The line of dung is thus compacted in the pipeline 11 in the sense of arrow b and is conveyed in the form of a line until it emerges on the underside of the storage place, where it builds up in the form of a cone, whereby an access of air to the pipeline as well as a freezing of the contents of the pipeline is precluded.

According to FIG. 3, the pressure means of FIG. 1, consisting of a worm and worm wheel, is replaced by a pressure piston 6, the piston rod 5 of which is driven by a motor. During a pressure stroke c of the piston 6 the dung fed into the feed hopper 7 is forced in the pipeline 8 through a non-return valve 9 in the sense of the arrow F into the pipeline 10, in which it is forced by the follow-up pressure into the communicating pipeline 12 and to the storage place 13. The return movement of the piston according to arrow g causes the non-return valve 9 to be closed in the sense of the arrow H to prevent the emerged line of dung from being sucked back. In other respects the function is the same as has been described hereinbefore with reference of FIG. 1.

As contrasted with the known conveying means the subject matter of the invention has in the first place the advantage that the means for conveying the dung to the storage place is lower in investment cost because it is sufficient to provide a simple pipeline with a simple pressure means. Besides, it is not susceptible to mechanical trouble and functions reliably owing to its frost-proof arrangement and the seal which prevents an access of air. The feeding to the storage place at the bottom avoids a constriction thereof with respect to the removal of the dung from the storage place so that the storage place remains accessible from all sides for the removal of the dung and the removal or the loading of the carrying vehicles will not be obstructed. The craterlike build-up of the dung from below eliminates the need for a manual distribution of the dung at the storage place. Any clogging in the pipeline can be removed if cleaning holes recessed like a channel are provided at various points thereof. Particularly the embodiment of FIG. 1, with conveyor screw and worm wheel, enables the mixing of all components of the dung to form a slidable line, which will also promote the thorough rotting of the dung in the storage place. Any loss of liquid manure and evaporation losses during conveyance and obnoxious smells in the environment are eliminated to a large extent. The airtight seal of the pipeline at both ends thereof prevents a deposition and crusting on the walls, so that the installation remains permanently in an operative condition. The screw and the worm wheel may be made, e.g., of cast iron, which will resist corrosion even by ammonia for many years, as experience has shown. These parts may also be made of bronze in particularly critical cases.

Depending on the levels of the storage place 7 and the feed hopper 2 or 7, conduits connected to the liquid manure tank may be connected to the feed hoppers 2 and 7 to prevent any liquid manure in the pipelines 11, 12 from flowing over the feed hopper 2 on the floor of the stable or the like (not shown in the drawing).

All known systems for feeding dung in the stable or the like may be used for feeding the described conveyor provided that the end points of such systems are disposed above the feed hopper 2 or 7.

The conveyor may be used for conveying dung as well as materials of similar consistency, such as feed mash or other pulps.

What I claim is:

1. A device for conveying manure without manual handling from a stable to a remote predetermined storage point which comprises the combination with a stable floor of a conduit embedded in the soil below said floor and thus completely underlying said floor and having an inlet communicating with the upper surface of said floor and an outlet communicating with said storage point whereby the contents of said conduit will be discharged upwardly to said storage point, said inlet being substantially funnel-shaped and being adapted to receive the manure to be conveyed, pressure means in said conduit adjacent said inlet for forcing the manure charged in said inlet through said conduit in the direction of said storage point, said pressure means being effective to compact the manure in said conduit whereby it is gradually conveyed toward said storage point as a substantially solid mass, and said pressure means cooperating with said conduit to insure unidirectional movement of said manure in said conduit and prevent reverse movement, said storage point having a supporting floor and a plurality of discharge pits therein, and said conduit being provided at its outlet end with a plurality of branch conduits, each of said branch conduits being connected respectively at its outlet end with the bottom of one of said discharge pits, whereby said outlet end of each branch conduit is always covered by the manure discharged into its associated pit, and each of said branch conduits being provided with closure means for selectively closing off each branch independently of the other branches.

2. A device for conveying manure without manual handling from a stable to a remote predetermined storage point which comprises the combination with a stable floor of a conduit embedded in the soil below said floor and thus completely underlying said floor and having an inlet communicating with the upper surface of said floor and an outlet communicating from below with said storage point whereby the contents of said conduit will be discharged upwardly to said storage point, said conduit being coated with a low-friction bituminous coating, said inlet being substantially funnel-shaped and being adapted to receive the manure to be conveyed, pressure means in said conduit adjacent said inlet for forcing the manure charged in said inlet through said conduit in the direction of said storage point, said pressure means being effective to compact the manure in said conduit whereby it is gradually conveyed toward said storage point as a substantially solid mass, and said pressure means cooperating with said conduit to insure unidirectional movement of said manure in said conduit and prevent reverse movement, said storage point having a supporting floor and a pit therein and the outlet end of said conduit communicating with the bottom of said pit whereby said outlet end is always covered by the manure discharged into said pit, said pressure means being a screw conveyor and a freely rotatable worm wheel having teeth engaging in said screw conveyor downstream of said inlet.

3. A device for conveying manure without manual handling from a stable to a remote predetermined storage point which comprises the combination with a stable floor of a conduit embedded in the soil below said floor and thus completely underlying said floor and having an inlet communicating with the upper surface of said floor and an outlet communicating with said storage point whereby the contents of said conduit will be discharged upwardly to said storage point, said conduit being coated with a low-friction bituminous coating, said inlet being substantially funnel-shaped and being adapted to receive the manure to be conveyed, pressure means in said conduit adjacent said inlet for forcing the manure charged in said inlet through said conduit in the direction of said storage point, said pressure means being effective to compact the manure in said conduit whereby it is gradually conveyed toward said storage point as a substantially solid mass, said pressure means cooperating with said conduit to insure unidirectional movement of said manure in said conduit and prevent reverse movement, said storage point having a supporting floor and a plurality of discharge pits therein, and said conduit being provided at its outlet end with a plurality of branch conduits, each of said conduits being connected respectively at its outlet end with the bottom of one of said discharge pits, whereby said outlet end is always covered by the manure discharged into its associated pit, each of said branch conduits being provided with closure means for selectively closing off each branch independently of the other branches, said pressure means being a screw conveyor and a freely rotatable worm wheel having teeth engaging in said screw conveyor downstream of said inlet.

References Cited in the file of this patent

UNITED STATES PATENTS

| | | |
|---|---|---|
| 178,647 | Lafferty | June 13, 1876 |
| 603,641 | Heyrock | May 10, 1898 |
| 1,941,573 | Marrow | Jan. 2, 1934 |
| 2,004,533 | Maynard | June 11, 1935 |
| 2,238,944 | Muller et al. | Apr. 22, 1941 |
| 2,672,970 | Klinzing | Mar. 23, 1954 |

FOREIGN PATENTS

| | | |
|---|---|---|
| 1,062,056 | Germany | July 23, 1959 |